United States Patent [19]

Kast et al.

[11] Patent Number: 5,187,936
[45] Date of Patent: Feb. 23, 1993

[54] CONTINUOUS FLOW FUEL CIRCULATION SYSTEM

[75] Inventors: Kevin H. Kast, Cincinnati; William J. Myers, Jr., West Chester, both of Ohio

[73] Assignee: General Electric Company, Cincinnati, Ohio

[21] Appl. No.: 599,171

[22] Filed: Oct. 17, 1990

[51] Int. Cl.$^5$ .............................................. F02C 1/00
[52] U.S. Cl. ...................... 60/734; 417/302; 417/441
[58] Field of Search ............... 60/734, 739, 740, 741; 417/302, 441

[56] References Cited

U.S. PATENT DOCUMENTS

| | | | |
|---|---|---|---|
| 2,619,162 | 11/1952 | Feilden | 60/740 |
| 2,757,961 | 8/1956 | Nims | 60/739 |
| 2,767,546 | 10/1956 | Hughes et al. | 60/39.281 |
| 2,781,638 | 2/1957 | Fletcher et al. | 60/39.281 |
| 2,807,135 | 9/1957 | Addie | 60/39.281 |
| 2,968,151 | 1/1961 | Abraham et al. | 60/39.281 |
| 3,006,407 | 10/1961 | Shew | 60/39.281 |
| 3,292,367 | 12/1966 | Bauger et al. | 60/734 |
| 3,707,074 | 12/1972 | Meyer et al. | 60/740 |
| 4,016,716 | 4/1977 | Evans et al. | 60/39.281 |
| 4,539,809 | 9/1985 | Stanley et al. | 60/39.094 |
| 4,578,945 | 4/1986 | Peck et al. | 60/39.281 |
| 4,802,334 | 2/1989 | Eder et al. | 60/261 |

FOREIGN PATENT DOCUMENTS 954584  8/1982  U.S.S.R. .............................. 60/734

Primary Examiner—Richard A. Bertsch
Assistant Examiner—Michael I. Kocharov
Attorney, Agent, or Firm—Bernard E. Shay; Jerome C. Squillaro

[57] ABSTRACT

An improved augmentor fuel supply system including a fuel source, a pump for pressurizing the fuel, a flow control means for controlling the flow and pressure of fuel to a fuel disbursement means (e.g., an augmentor) and a return path for recirculating unburned fuel. The flow control means includes a restrictor means such as a small orifice in parallel with a controllable valve. The restrictor means allows fuel to flow to the fuel disbursement means when the controllable valve is shut off. Further, according to the present invention, a second restrictor means, such as a small orifice is included in the return path. Finally, a check valve is included in the return path to ensure that fuel does not flow into the augmentor through the return path.

5 Claims, 2 Drawing Sheets

CONTINUOUS FLOW FUEL CIRCULATION SYSTEM

FIELD OF INVENTION

The U.S. Government has rights in this invention pursuant to contract number F33657-83-C-0281 awarded by the Department of the Air Force.

The present invention relates, in general, to continuous flow systems for augmentors and, more particularly, to a dual orifice continuous flow system.

BACKGROUND OF THE INVENTION

Augmentors, also referred to as afterburners, are located in the exhaust section of many jet engines. Augmentors are designed to inject fuel directly into the engine exhaust. The injected fuel, when ignited provides supplemental thrust. Since augmentors are normally used to provide supplemental thrust in emergency situations, it is desirable to inject fuel into the exhaust immediately after receiving the augmentor command. Therefore, it is desirable to leave the augmentor manifolds full of fuel when the augmentor nozzles are closed. Unfortunately, since the augmentor is located in the exhaust section of the engine, it gets extremely hot and fuel in the manifold will tend to evaporate.

When jet fuel evaporates, it can leave layers of carbon on the inside of the augmentor. This carbon buildup can damage and may eventually block the nozzles. Evaporation can be avoided by continuously circulating fuel through the augmentor manifold.

When an augmentor is spraying fuel into the exhaust, it is said to be in the active mode. When an augmentor is not spraying fuel into the exhaust, it is said to be in the dry mode. Thus, fuel being recirculated to prevent evaporation is referred to as dry flow.

In one known arrangement (see U.S. Pat. No. 4,802,334), a system is described wherein the augmentor is drained after each use to avoid carbon buildup (also known as coking) due to fuel evaporation. When fuel is desired, it is pumped at a first, high rate, to fill the augmentor manifold and at a second, lower rate when the augmentor manifold is full.

In other known arrangements, recirculating flow may be provided by using a valve in the return path which is closed when the augmentor demands fuel. This return path valve could be a simple shutoff valve or, alternatively, a flow fuse or vent valve designed to close when the fuel pressure in the augmentor reaches a predetermined level.

Augmentor nozzles spray fuel into the engine exhaust in a predetermined pattern. In order to limit the number of control lines and the amount of control logic, it is desirable to use pressure actuated valves in the augmentor nozzles. The pressure actuated valves open when the fuel pressure in the actuator reaches a predetermined level. As an example, valves known as cracking valves may be used. Cracking valves are forced open by the pressure of the fuel in the augmentor manifold.

It would, therefore, be desirable to design an augmentor fuel supply system which achieves the pressures necessary to open the pressure actuated augmentor nozzles during augmentor operation, while providing for a continuous flow of fuel through the augmentor manifold during dry operation.

SUMMARY OF THE INVENTION

An improved augmentor fuel supply system including a fuel source, a pump for pressurizing the fuel, a flow control means for controlling the flow and pressure of fuel to the augmentor and a return path for recirculating unburned fuel. According to one embodiment of the present invention, the flow control means includes a restrictor means such as a small orifice in parallel with a controllable valve. The restrictor means allows fuel to flow to the augmentor when the controllable valve is shut off. Further, according to the present invention, a second restrictor means, such as a small orifice is included in the return path. Finally, a check valve is included in the return path to ensure that fuel does not flow into the augmentor through the return path.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
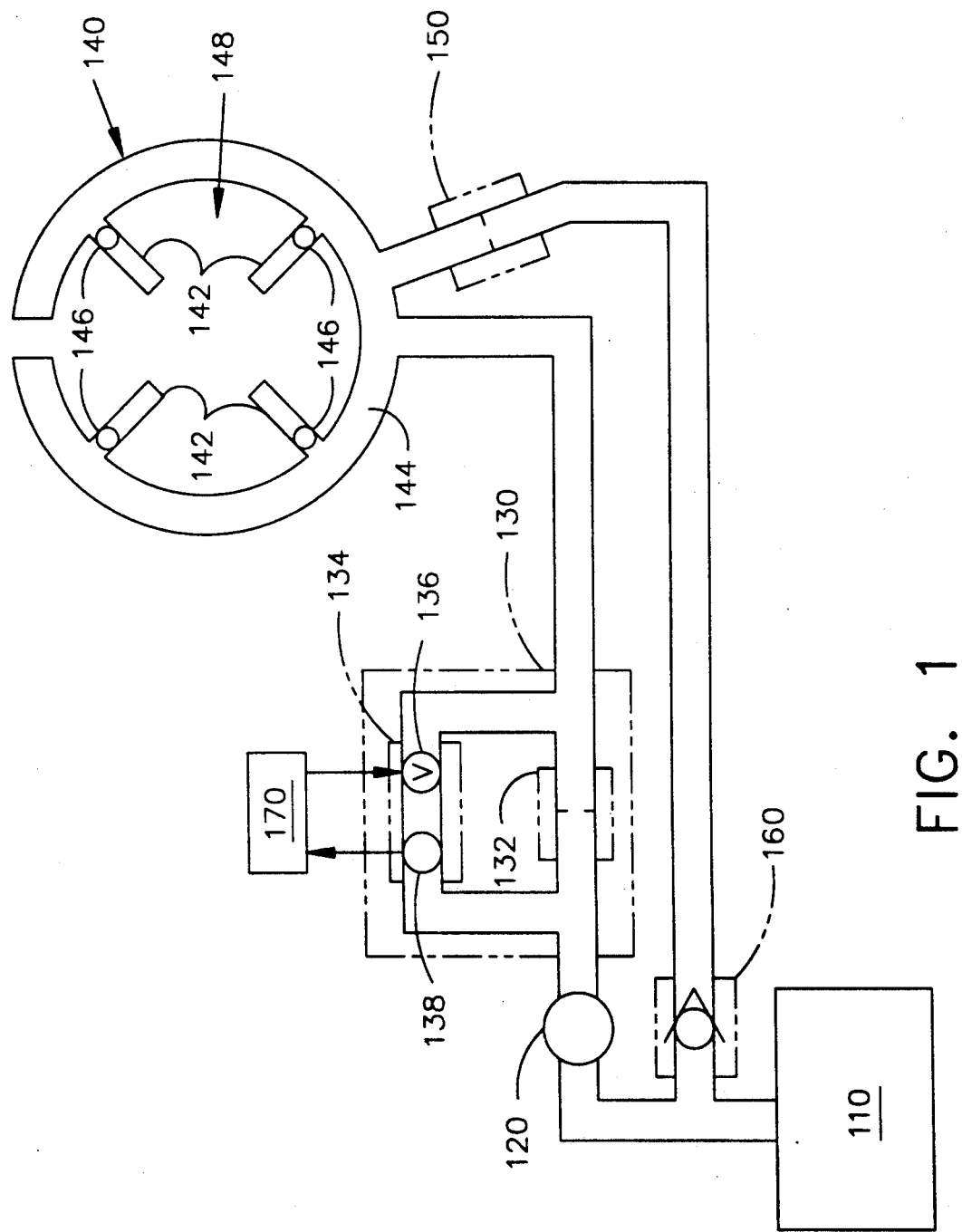
FIG. 1 illustrates an embodiment of the present invention.

FIG. 1 illustrates one embodiment of the present invention. In FIG. 1, main fuel pump 120 supplies fuel to a fuel disbursement means (e.g., an augmentor or combustor) through flow control means 130 which is controlled by logic 170. Unused fuel is returned to the system through restrictor means 150 and check valve 160.

More particularly, in FIG. 1, fuel source 110 is connected to the input of main fuel pump 120. The output of main fuel pump 120 is connected to the input of flow control means 130. Flow control means 130 may include a first flow restrictor means 132 and a controllable valve 134. Restrictor means 132 and controllable valve 134 are connected in parallel such that the input of flow control means 130 is connected to the input of both first restrictor means 132 and controllable valve 134. The outputs of restrictor means 132 and controllable valve 134 are both connected to the output of flow control means 130. The output of flow control means 130 is connected to fuel disbursement means 140. Fuel disbursement means 140 includes a main manifold 144 connected to a plurality of nozzles 142 through pressure actuated valves 146. Fuel disbursement means 140 is connected to second restrictor means 150. Second restrictor means 150 is connected to the input of check valve 160. The output of check valve 160 is connected to the input of main fuel pump 120.

In operation, fuel is pumped from fuel source 110 by main fuel pump 120. Fuel source 110 may be any appropriate source of fuel, such as a fuel tank for a jet aircraft. It will also be understood that fuel source 110 may include additional pumping apparatus such as a boost pump. Main fuel pump 120 may be, for example, a centrifugal pump, a gear type pump or other type of pump adapted to pressurized the fuel from fuel source 110.

The pressurized fuel may be routed to particular disbursement or control means. Examples of disbursement means include the combustion chamber, and the augmentor of gas turbine engines.

In the embodiment of FIG. 1, the illustrated fuel circuit includes only a single disbursement means 140, other fuel circuits have been omitted for the sake of clarity. However, it will be apparent to one of skill in the art that main fuel pump 120 may, in practice, be used to supply multiple fuel circuits (including fuel circuits substantially similar to and fuel circuits which differ from the circuit illustrated in FIG. 1). An example of a control means to which pressurized fuel might be routed by pump 120 is fuel actuated hydraulic controls such as those used to control variable stator vanes in a gas turbine engine.

Since the disbursement means in FIG. 1 does not require constant fuel flow, the flow of pressurized fuel may be controlled by flow control means 130. Where it is desirable to allow a limited fuel flow to disbursement means 140, the flow control means may include a restrictor means 132 which is designed to allow a limited amount of fuel to pass continuously through flow control means 130. When the demand for fuel increases, controllable valve 134 may be opened to provide sufficient fuel to meet the demand.

Controllable valve 134 (also referred to as an augmentor fuel control) may comprise, for example, adjustable valve 136 and a feedback means 138. Adjustable valve 136 may be, for example, a valve having an integral throttling valve such as a spool valve or a flat plate valve. Feedback means 138 may be, for example, a Linear Variable Differential Transducer (LVDT). Alternatively feedback means 138 may be a flow control meter adapted to measure the flow through adjustable valve 136. The flow through controllable valve 134 may be controlled by, for example, control logic 170. Embodiments of suitable control logic are described in concurrently filed, co-pending application titled "Fuel Circulation Control System", Ser. No. 07/599,211, filed Oct. 17, 1990, which is hereby incorporated by reference. Control logic is adapted to determine the fuel needs of disbursement means 140, either by modeling or the use of sensors. Alternatively, some combination of modeling and sensors may be used to determine the fuel needs of disbursement means 140. Based upon the fuel needs of disbursement means 140 and the pressure at the output of main fuel pump 120, control logic 170 adjusts valve 136 to provide the correct flow. Feedback means 138 provides an indication of the position of valve 136 to control logic 170.

Fuel from flow control means 130 is passed to disbursement means 140. Disbursement means 140 includes, for example, nozzle means 142 for spraying the fuel into chamber 148. Disbursement means 140 may be, for example, an augmentor ring or a combustor such as a duel annular combustor. In one embodiment of the present invention, disbursement means 140 is an augmentor ring designed to spray fuel into an exhaust nozzle when pressure actuated valves 146 are opened. When pressure actuated valves 146 are opened fuel flows through nozzles 142 to the augmentor. Pressure actuated valves 146 may be cracking valves or distributor valves which are opened by the fuel pressure in manifold 144 of disbursement means 140. In one embodiment of the present invention, pressure actuated valves 146 are, for example, cracking valves which open when the fuel pressure in manifold 144 reaches a predetermined level. The fuel pressure in manifold 144 may be controlled by, for example, opening controllable valve 134. When controllable valve 134 is opened it will be the main fuel flow path through flow control means 130. Thus, in the active mode, when controllable valve 134 is opened, the pressure in manifold 144 builds up, opening pressure actuated valves 146 and fuel flows into manifold 144 and out of nozzles 142 through pressure actuated valves 146. Comparatively little fuel will flow through restrictor means 132. Fuel which does not pass through nozzles 142 passes out of disbursement means 140 through second restrictor means 150.

When pressure actuated valves 146 are open, substantially all of the fuel in manifold 144 will flow through nozzles 142. When pressure actuated valves 146 are closed, as, for example, by closing controllable valve 134, the fuel in manifold 144 will flow through second restrictor means 150. As described above, closing controllable valve 134 reduces the fuel pressure in manifold 144 enough to allow pressure actuated valves 146 to close, eliminating fuel flow through nozzles 142. When controllable valve 134 is closed, all the fuel passing through flow control means 130 will flow through first restrictor means 132 of flow control means 130.

It will be recognized that fuel will flow continuously through first restrictor means 132 and second restrictor means 150. Fuel leaving second restrictor means 150 passes through check valve 160 and into the input of main fuel pump 120. Thus, the arrangement according to the present invention provides a continuous flow of fuel in manifold 144. This continuous flow of fuel is sufficient to prevent evaporation of the fuel in manifold 144 and, thus, to inhibit the buildup of carbon deposits in manifold 144.

It will be recognized that, since pressure actuated valves 146 open only when the pressure in manifold 144 reaches a predetermined level, the pressure drop across first restrictor means 132 must be sufficient to ensure that, with controllable valve 134 closed, the pressure in manifold 144 is lower than the pressure required to open pressure actuated valves 146. Further, with controllable valve 134 closed, the pressure drop across restrictor means 150 must be low enough to ensure that pressure actuated valves 146 remain closed. Thus, with controllable valve 134 closed, the pressure drop across first restrictor means 132 plus the pressure drop across the second restrictor means 150 must be less than the fuel pressure required to open pressure actuated valves 146.

With controllable valve 134 open, the pressure drop across that valve controls the pressure drop across flow control means 130, substantially eliminating the effect of first restrictor means 132. However, the pressure drop across second restrictor means 150 must be sufficient to ensure that the fuel pressure in manifold 144 of disbursement means 140 is high enough to open pressure actuated valves 146.

It will be recognized that it is desirable to maximize the flow of fuel through manifold 144 during the dry periods. Therefore, for fuel circulation purposes, it would be advantageous to maximize the size of the openings in the restrictor means. However, it is necessary to ensure that the opening in the first restrictor means is small enough to ensure that pressure actuated valves 146 do not open as a result of the pressure from fuel circulating in the dry mode. Conversely, the opening in the second restrictor means 150 must be small enough to ensure that the pressure in manifold 144 exceeds the pressure required to open pressure actuated valves 146 during the active mode (i.e., when controllable valve 134 is opened).

In one embodiment of the present invention, first restrictor means 132 and second restrictor means 150 comprise calibrated orifices. The first restrictor means is a first calibrated orifice which is highly restrictive, allowing only a small portion of the fuel from main pump 120 to pass through flow control means 130 when controllable valve 134 is closed. Thus, with controllable valve 134 closed, the pressure in manifold 144 of disbursement means 140 remains low. The second restrictor means is also a calibrated orifice which is less restrictive, however, the second orifice is restrictive enough to allow the pressure in manifold 144 to open pressure actuated valves 146 when controllable valve 134 is open.

Normally orifices of this type are characterized by their flow coefficient. The flow coefficient of a particular orifice is a measure of the fluid resistance of that orifice. Flow coefficients are defined in units of lohms (a 1 lohm restriction will permit a flow of 100 gallons per minute of water with a pressure drop of 25 psi at a temperature of 80° F.).

The optimum flow coefficient $L_1$ for the first restrictor means of a particular system is a flow coefficient which is small enough to ensure a continuous supply of fuel to manifold 144 while being large enough to ensure that the pressure manifold 144 is not enough to open pressure actuated valves 146 in the dry mode. The minimum flow coefficient (L1) for first restrictor means 132 could be calculated by the equation:

$$L_1 = \frac{10,000 \sqrt{(P_1 - P_2) * SG}}{WFR_1}$$

It will be recognized that $L_1$ should be increased by an amount sufficient to ensure that valves 146 are not opened accidentally, taking into account variations in system fuel pressure, pump output pressure, etc.

The optimum flow coefficient ($L_2$) for the second restrictor means is a flow coefficient which is small enough to ensure the continuous recirculation of fuel in the dry mode while being large enough to ensure that pressure actuated valves 146 open in the active mode. The maximum flow coefficient ($L_2$) at the second restrictor means 150 could be calculated by the equation:

$$L_2 = \frac{10,000 \sqrt{(P_2 - P_3) * SG}}{WFR_2}$$

It will be recognized that $L_2$ should be increased by an amount sufficient to ensure that valves 146 open and remain open during the active mode taking into account variations in system fuel pressure, pump output pressure, etc.

In these two equations, $P_1$ the input pressure to the first restrictor means (normally the output pressure of main fuel pump 120). $P_2$ is the pressure (cracking pressure) required to open valves 146. $P_3$ is the pressure at the outlet of the second restrictor means (normally the pressure at the inlet of main fuel pump 120). $WFR_1$ is the flow through the first restrictor means and $WFR_2$ is the flow through the second restrictor means in pounds per hour. The pressures herein are normally specified in pounds per square inch. SG is the specific gravity of the fuel. These are general design specifications, therefore, the actual valves will vary from system to system. However, the defining equation may be used for any fuel supply system similar to the system illustrated in FIG. 1 and described herein.

In one alternative embodiment of the present invention, valves 146 may not all open at the same fuel pressure. Such a system might be used where the augmentor nozzles are staged. Alternatively, fuel manifold 140 could be a multinozzle combustor such as a duel annular combustor arrangement where the fuel nozzles are staged to open at a first and second fuel pressure. Where pressure actuated valves 146 open at different pressures, the pressure ($P_2$) used to calculate the optimum flow coefficient ($L_2$) of second restrictor means 150 would be the lowest pressure required to open any of valves 146.

In a further embodiment of the present invention, first restrictor 132 may be eliminated and controllable valve 134 used to provide the dry flow. That is, in the dry mode, flow through flow control means 130 could be restricted by leaving adjustable valve 136 partially open instead of closing it all the way. In this embodiment, valve 136 would be left open enough to ensure that its flow coefficient was approximately equal to $L_1$ as calculated above. Alternatively, an apperture having a flow coefficient of $L_1$ could be included in adjustable valve 136.

The system illustrated in FIG. 1 includes first restrictor means 132 with a flow coefficient $L_1$ and a second restrictor means 150 with a flow coefficient $L_2$. When controllable valve 134 is closed, the pressure actuated valves 146 are closed and fuel flows through first restrictor means 132 and second restrictor means 150. In the dry mode, fuel having a specific gravity SG flows through the first and second restrictor means at a rate of:

$$\frac{10,000 * \sqrt{(P_1 - P_3) * SG}}{\sqrt{L_1^2 + L_2^2}}$$

In this equation, $P_1$ is the pressure at the input to first restrictor means 132 (which is normally substantially equal to the pressure at the outlet of pump 120). $P_3$ is the pressure out of the second restrictor means (which is normally substantially equal to the inlet pressure at pump 120).

In the active mode, with controllable valve 134 and pressure actuated valves 146 open, fuel flows through the controllable valve at a rate of:

$$WFE + \frac{10,000 \sqrt{(P_2 - P_3) * SG}}{L_2} - \frac{10,000 \sqrt{(P_1 - P_2) * SG}}{L_1}$$

In this equation, $P_2$ is the pressure in manifold 144 and WFE is the fuel flow through the nozzles of the fuel disbursement means.

Figure 2:
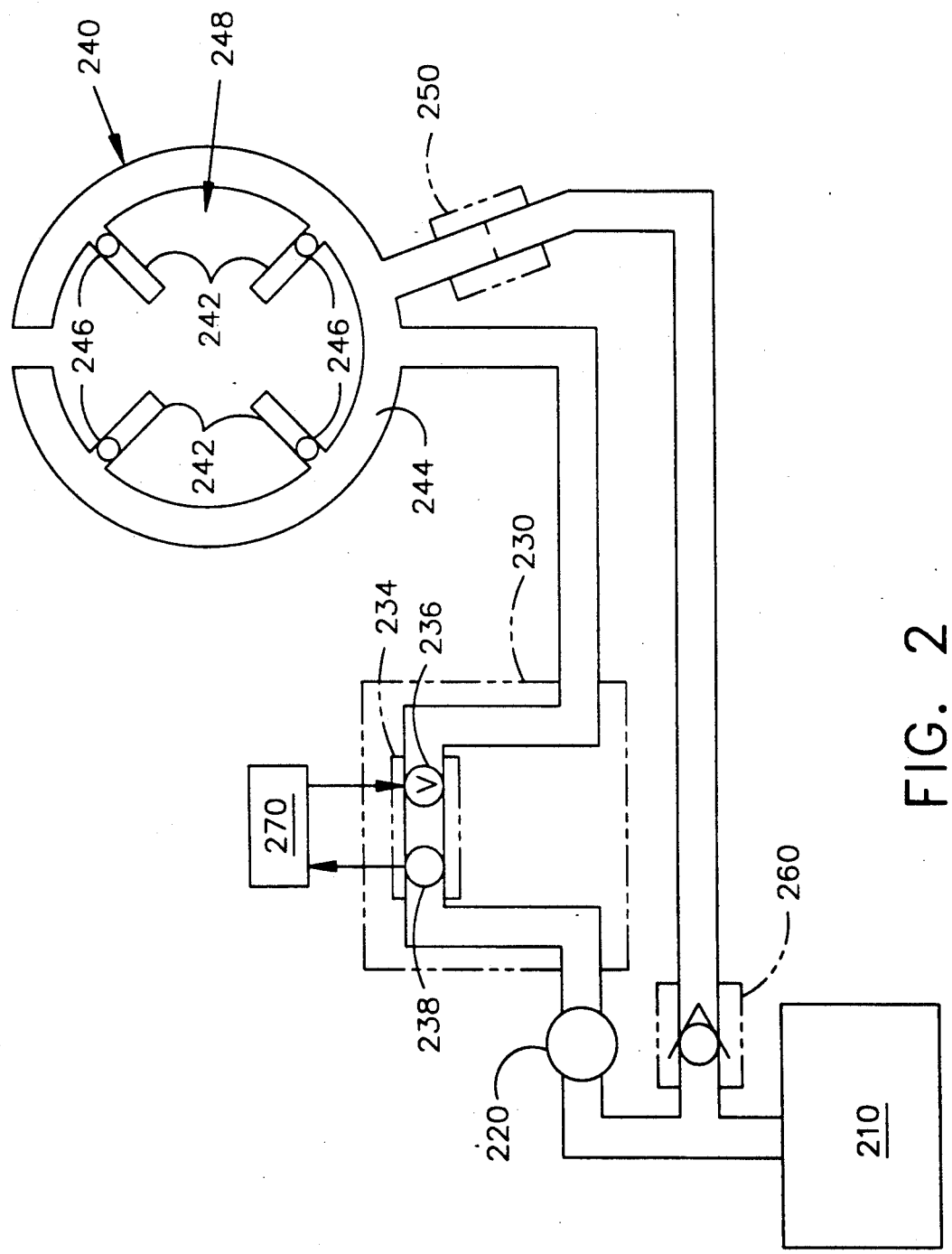
FIG. 2 illustrates an alternate embodiment of the present invention.

FIG. 2 illustrates a further embodiment of the present invention wherein adjustable valve 236 may be held open to allow fuel to flow continuously. In the "active" mode, when fuel is demanded by fuel disbursement means 240, adjustable valve 236 may be opened to supply the demand (e.g., the fuel pressure required to open pressure actuated valves 246). In FIGS. 1 and 2, elements having reference numbers with like second and third digits have like operating characteristics and structure (e.g., main fuel pump 120 has the same structure and function as main fuel pump 220).

In a further embodiment of the present invention, restrictor means 132 could include a valve to shut off the flow of fuel through restrictor means 132 when the fuel system was in the "active" mode, that is, when fuel was flowing through controllable valve 134.

It will be recognized that, by circulating fuel through manifold 144, the present invention substantially eliminates evaporation and, thus coking, in disbursement means 140. It will further be recognized that, by circulating fuel through manifold 144 the present invention reduces heat buildup in disbursement means 140. By reducing heat buildup, the maximum temperatures encountered in disbursement means 140 are reduced.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What we claim is:

1. A continuous flow fuel system comprising:
   a fuel source;
   a main fuel pump connected to said fuel source;
   a flow control means connected to said main fuel pump, said flow control means including a controllable valve in parallel with a first flow restrictor means;
   a fuel disbursement means connected to said flow control means, said disbursement means including a plurality of fuel nozzles connected to a main manifold of said disbursement means through pressure actuated valves; and
   a second flow restrictor means connected between said fuel disbursement means and an inlet of said main fuel pump.

2. A continuous flow system according to claim 1 wherein:
   said first and second flow restrictor means comprise orifices which restrict the flow of fuel.

3. A continuous flow system according to claim 2 wherein:
   the flow coefficient of said first orifice exceeds $$\frac{10,000 \sqrt{(P_1 - P_2) * SG}}{WFR_1}$$

where
   $P_1$ is the input pressure to said orifice;
   $P_2$ is the pressure required to open said pressure actuated valves;
   $WFR_1$ is the maximum dry flow through said first restrictor means; and
   SG is the specific gravity of the fuel.

4. A continuous flow of said second orifice is less wherein:
   the flow coefficient of said second orifice is less than:

$$\frac{10,000 \sqrt{(P_2 - P_3) * SG}}{WFR_2}$$

where
   $WFR_2$ is the maximum dry flow through said second orifice;
   $P_3$ is the pressure at the outlet of said second restrictor means.

5. A continuous flow fuel system comprising:
   a fuel source;
   a main fuel pump connected to said fuel source;
   a flow control means connected to said main fuel pump, said flow control means including a controllable valve in parallel with a first orifice;
   a fuel disbursement means connected to said flow control means, said disbursement means including a plurality of fuel nozzles connected to a main manifold of said disbursement means through pressure actuated valves;
   a second orifice connected between said fuel disbursement means and an inlet of said main fuel pump;
   wherein the flow coefficient of said first orifice exceeds:

$$\frac{10,000 \sqrt{(P_1 - P_2) * SG}}{WFR_1}$$

where
   $P_1$ is the input pressure to said orifice;
   $P_2$ is the pressure required to open said pressure actuated valves;
   $WFR_1$ is the maximum dry flow through said first restrictor means; and
   SG is the specific gravity of the fuel;
   wherein the flow coefficient of said second orifice is less than:

$$\frac{10,000 \sqrt{(P_2 - P_3) * SG}}{WFR_2}$$

where
   $WFR_2$ is the maximum dry flow through said second orifice;
   $P_3$ is the pressure at the outlet of said second restrictor means.

* * * * *